(12) United States Patent
Melkote et al.

(10) Patent No.: US 8,059,360 B1
(45) Date of Patent: Nov. 15, 2011

(54) DISK DRIVE COMPENSATING FOR RADIAL PHASE CHANGE OF REPEATABLE POSITION ERROR DUE TO SERVO WRITING FROM SPIRAL TRACKS

(75) Inventors: Hemant Melkote, San Jose, CA (US); Donald Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/820,536

(22) Filed: Jun. 22, 2010

(51) Int. Cl.
*G11B 5/596* (2006.01)
(52) U.S. Cl. .................................. 360/77.04
(58) Field of Classification Search .................. None
See application file for complete search history.

(56) References Cited

U.S. PATENT DOCUMENTS

| | | | |
|---|---|---|---|
| 5,668,679 A | 9/1997 | Swearingen et al. | |
| 6,922,596 B2 * | 7/2005 | Erickson et al. | 360/77.04 |
| 6,987,638 B1 * | 1/2006 | Brunnett et al. | 360/77.04 |
| 7,088,533 B1 | 8/2006 | Shepherd et al. | |
| 7,119,981 B2 | 10/2006 | Hanson et al. | |
| 7,230,786 B1 | 6/2007 | Ray et al. | |
| 7,265,933 B1 | 9/2007 | Phan et al. | |
| 7,333,280 B1 * | 2/2008 | Lifchits et al. | 360/75 |
| 7,333,410 B2 | 2/2008 | Serrano | |
| 7,375,918 B1 | 5/2008 | Shepherd et al. | |
| 7,391,584 B1 * | 6/2008 | Sheh et al. | 360/75 |
| 7,411,758 B1 * | 8/2008 | Cheung et al. | 360/75 |
| 7,502,195 B1 * | 3/2009 | Wu et al. | 360/75 |
| 7,551,387 B2 * | 6/2009 | Sun et al. | 360/75 |
| 7,583,470 B1 * | 9/2009 | Chen et al. | 360/77.04 |
| 7,675,702 B2 * | 3/2010 | Watt et al. | 360/75 |
| 7,675,707 B1 | 3/2010 | Liu et al. | |
| 7,773,334 B1 * | 8/2010 | Rutherford | 360/75 |
| 2008/0239556 A1 * | 10/2008 | Wiseman et al. | 360/77.08 |

* cited by examiner

*Primary Examiner* — Hoa T Nguyen
*Assistant Examiner* — James L Habermehl

(57) ABSTRACT

A disk drive is disclosed comprising a head actuated over a disk comprising a plurality of servo sectors defining a plurality of tracks, wherein the servo sectors are written to the disk by servoing off of spiral tracks. The head is positioned over a target track in response to the servo sectors, and coefficients of a first sinusoid are generated corresponding to the target track, wherein the first sinusoid corresponds a repeatable position error of the head relative to the target track. The coefficients of the first sinusoid comprise a coherent component due to a repeatable runout of the disk and a spiral component due to writing the servo sectors by servoing off of the spiral tracks, where the spiral component varies based on a radial location of the head. The head is servoed over the target track in response to the coefficients.

18 Claims, 7 Drawing Sheets

$a = a^{coh} + a^{sp}$
$b = b^{coh} + b^{sp}$

8,059,360 B1

DISK DRIVE COMPENSATING FOR RADIAL PHASE CHANGE OF REPEATABLE POSITION ERROR DUE TO SERVO WRITING FROM SPIRAL TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14, which are recorded with precise intervals and offsets relative to the track centerlines. The servo bursts 14 provide fine head position information used for centerline tracking while accessing a data track during write/read operations.

There are several prior art techniques for writing the servo sectors to the disk, including an external servo writer that writes the servo sectors by controlling the head internal to the disk drive using precise external positioning mechanics, such as a laser interferometer. Other techniques may involve self servo writing the servo sectors by servoing off of a seed pattern, or by propagating the servo sectors across the radius of the disk. In yet another technique, a media writer may simultaneously write the servo sectors to a number of disk surfaces, and then one or more of the servo written disks installed into a production disk drive. A similar technique may use a printing technique (e.g., stamping or etching technique) to servo write the disks which are then inserted into a production disk drive.

DETAILED DESCRIPTION OF EMBODIMENTS OF THE INVENTION

Figure 1:
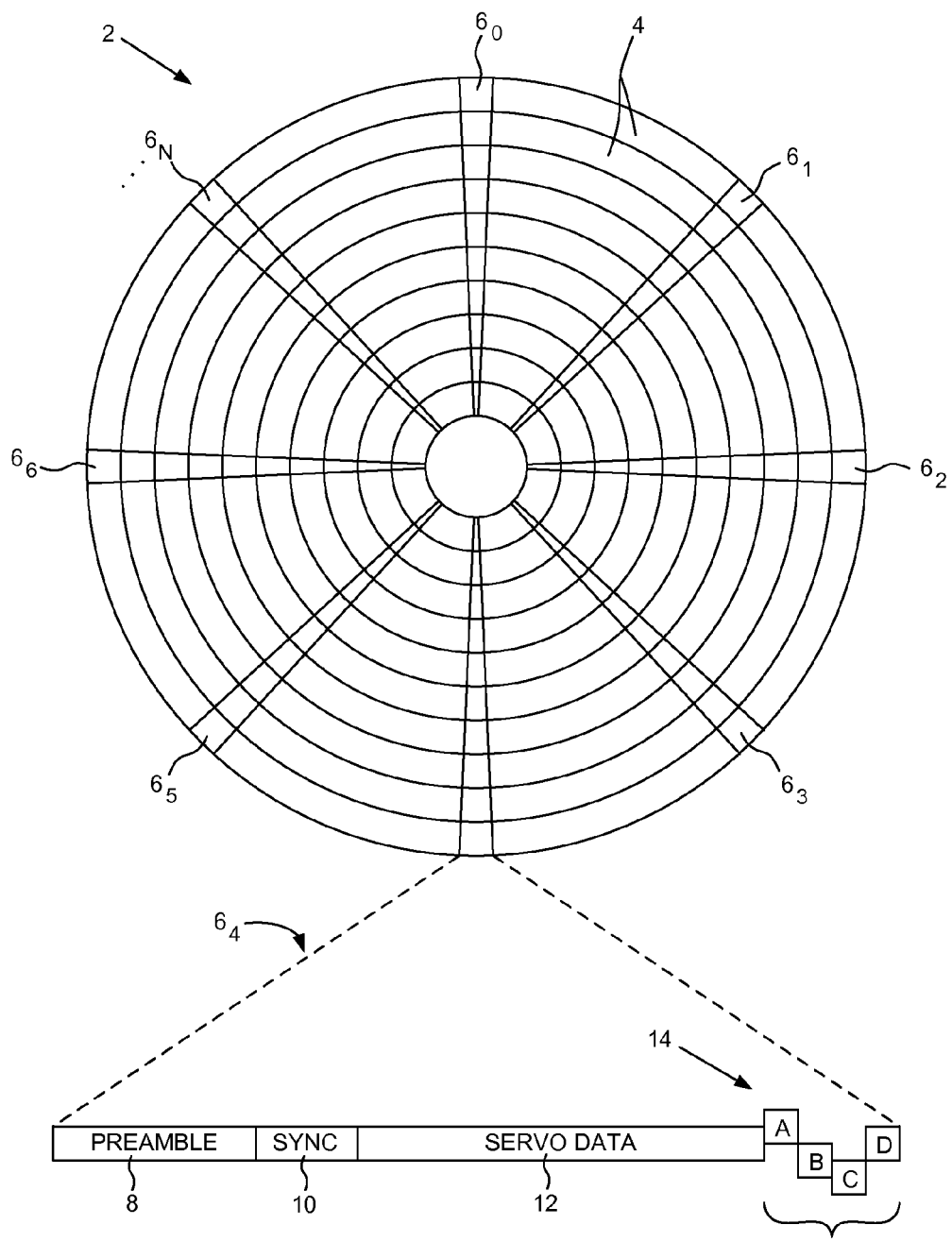
FIG. 1 shows a prior art disk format comprising a plurality of servo tracks defined by servo sectors.
Figures 2A, 2B, 2C:
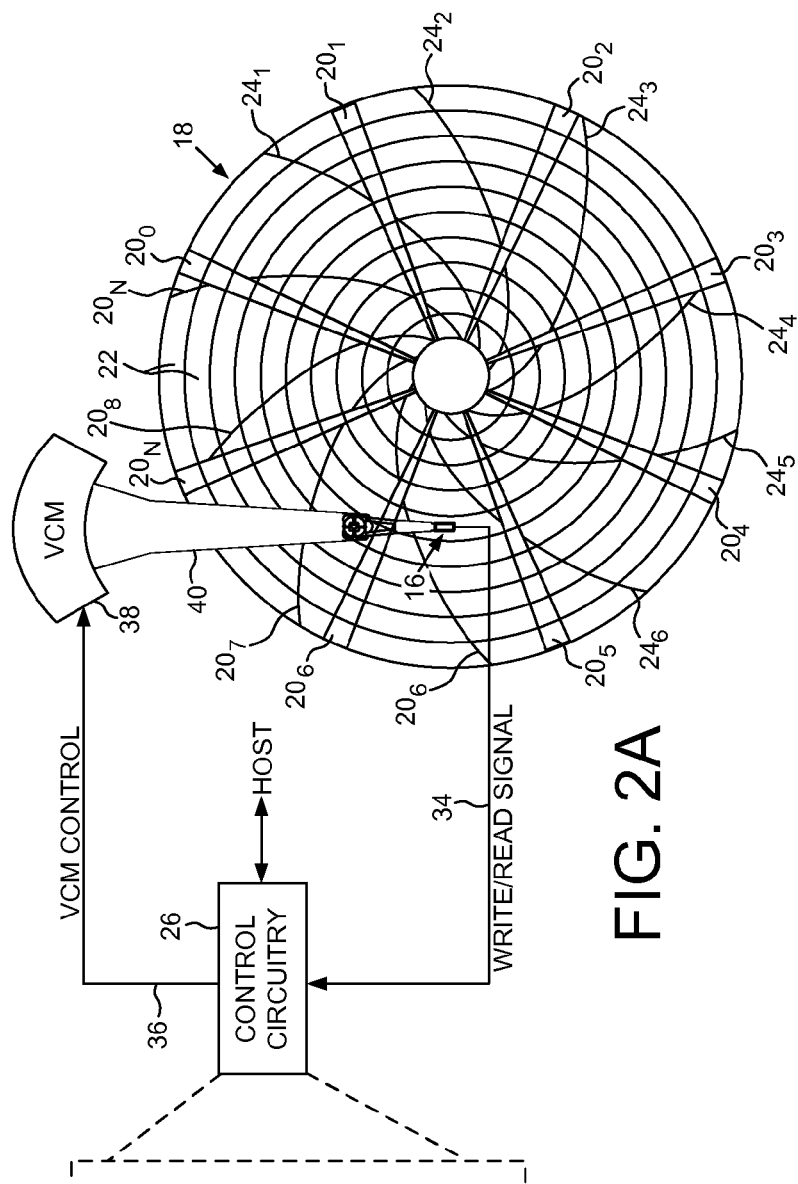
FIG. 2A is a disk drive according to an embodiment of the present invention comprising a head actuated over a disk comprising servo sectors written to the disk by servoing off of spiral tracks.
FIG. 2B is a flow diagram for generating coefficients of a sinusoid corresponding to a repeatable position error of the head relative to a target track according to an embodiment of the present invention.
FIG. 2C shows an embodiment of the present invention wherein the coefficients of the sinusoid comprises a coherent component and a spiral component.

FIG. 2A shows a disk drive according to an embodiment of the present invention comprising a head 16 actuated over a disk 18 comprising a plurality of servo sectors $20_0$-$20_N$ defining a plurality of tracks 22, wherein the servo sectors $20_0$-$20_N$ are written to the disk 18 by servoing off of spiral tracks $24_0$-$24_N$. The disk drive further comprises control circuitry 26 operable to execute the flow diagram of FIG. 2B, wherein after the head is positioned over a target track in response to the servo sectors (step 28), coefficients of a first sinusoid are generated corresponding to the target track (step 30), wherein the first sinusoid corresponds a repeatable position error of the head relative to the target track. FIG. 2C shows an embodiment where the coefficients of the first sinusoid comprise a coherent component due to a repeatable runout of the disk and a spiral component due to writing the servo sectors by servoing off of the spiral tracks, where the spiral component varies based on a radial location of the head. The head is servoed over the target track in response to the coefficients (step 32).

In the embodiment of FIG. 2A, the control circuitry 26 processes a read signal 34 emanating from the head 16 to read the servo sectors $20_0$-$20_N$ and generate a position error signal (PES) representing a position of the head 16 relative to the tracks 22. The control circuitry 26 comprises a suitable servo compensator which filters the PES to generate a control signal 36 applied to a voice coil motor (VCM) 38. The VCM 38 rotates an actuator arm 40 about a pivot in response to the control signal 36 in order to move the head 16 radially over the disk in a direction that reduces the PES.

The servo sectors $20_0$-$20_N$ may be written to the disk 18 by servoing off of the spiral tracks $24_0$-$24_N$ using any suitable technique. In one embodiment, a filler station may process each head disk assembly (HDA) prior to attaching a printed circuit board comprising the control circuitry 26 to the HDA. In another embodiment, the control circuitry 26 of each disk drive may write the servo sectors $20_0$-$20_N$ to the disk 18 while servoing off of the spiral tracks $24_0$-$24_N$.

Figure 3A:
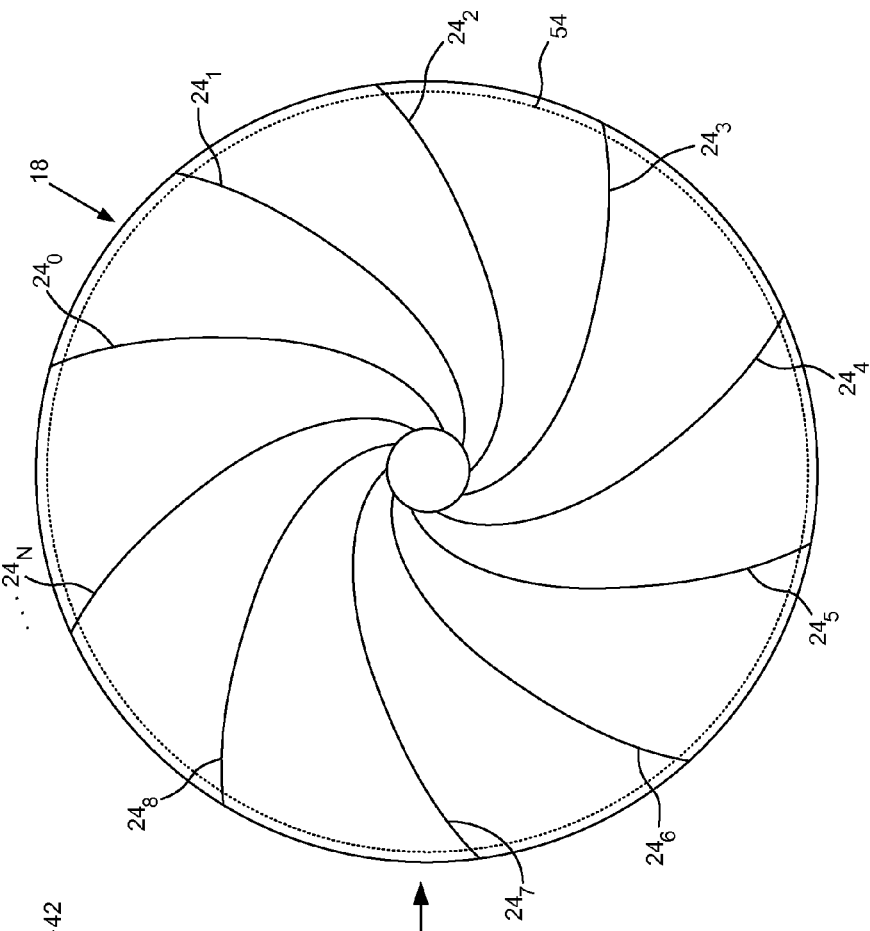
FIGS. 3A and 3B show an external spiral track writer for writing spiral tracks to a disk according to an embodiment of the present invention.
Figure 3B:
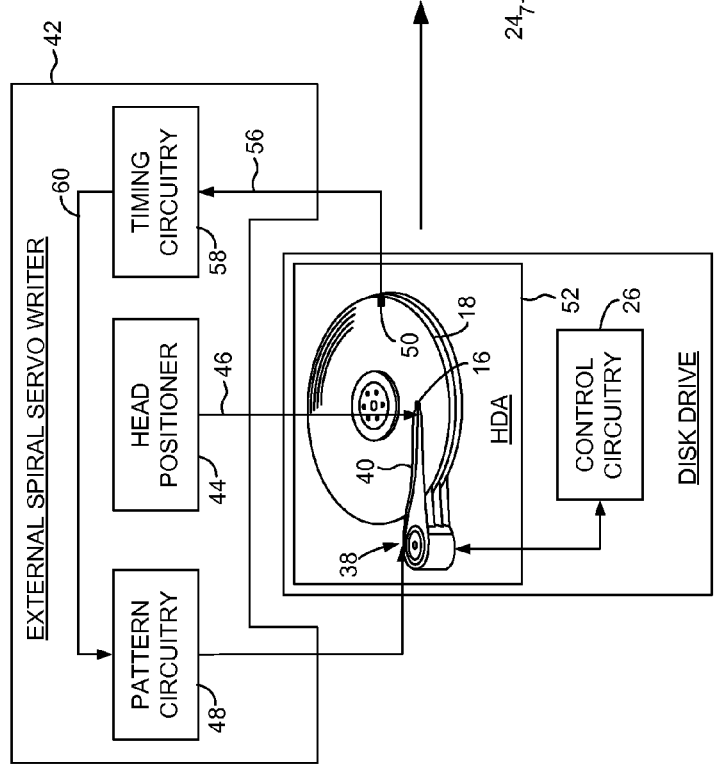

The spiral tracks $24_0$-$24_N$ may be written to the disk 18 using any suitable technique, such as with an external servo writer or a media writer. FIGS. 3A and 3B show an embodiment wherein an external spiral servo writer 42 comprises a head positioner 44 for actuating a head positioning pin 46 using sensitive positioning circuitry, such as a laser interferometer. Pattern circuitry 48 generates the data sequence written to the disk 18 for the spiral tracks $24_0$-$24_N$. The external spiral servo writer 42 inserts a clock head 50 into the HDA 52 for writing a clock track 54 (FIG. 3B) at an outer diameter of the disk 18. The clock head 50 then reads the clock track 54 to generate a clock signal 56 processed by timing recovery circuitry 58 to synchronize the write clock 60 for writing the spiral tracks $24_0$-$24_N$ to the disk 18. The timing recovery circuitry 58 enables the pattern circuitry 48 at the appropriate time relative to the write clock 60 so that the spiral tracks 24₀-24ₙ are written at the appropriate circular location. The timing recovery circuitry 58 also enables the pattern circuitry 48 relative to the write clock 60 to write sync marks within the spiral tracks 24₀-24ₙ at the same circular location from the outer diameter to the inner diameter of the disk 18. The constant interval between sync marks (independent of the radial location of the head 16) enables a servo write clock to maintain synchronization while writing the product servo sectors to the disk.

Figure 4:
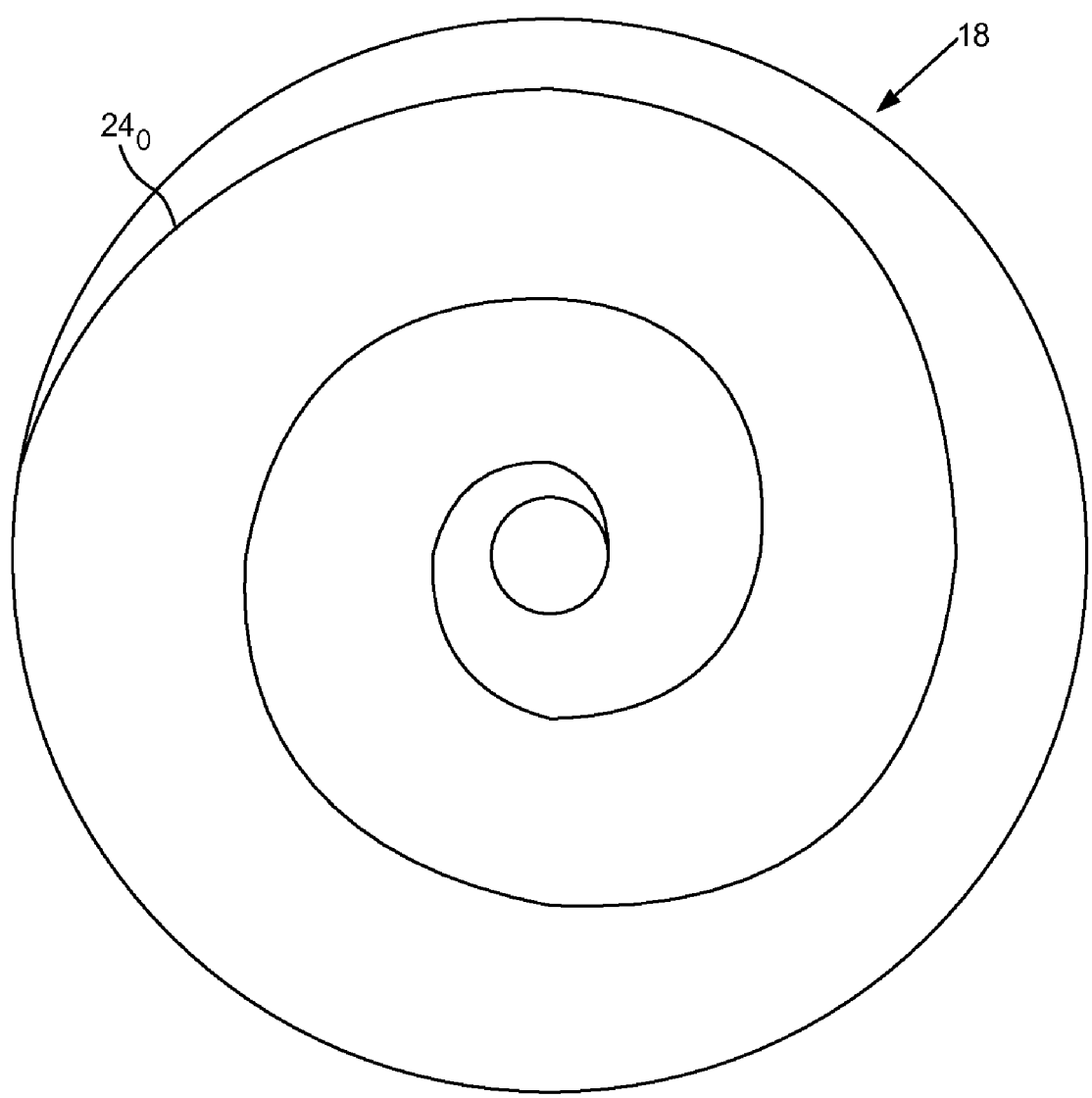
FIG. 4 shows an embodiment of the present invention wherein each spiral track is written over multiple disk revolutions.

In the embodiment of FIG. 3B, each spiral track 24ᵢ is written over a partial revolution of the disk 18. In an alternative embodiment, each spiral track 24ᵢ is written over one or more revolutions of the disk 18. FIG. 4 shows an embodiment wherein each spiral track 24ᵢ is written over multiple revolutions of the disk 18. In the embodiment of FIG. 3A, the entire disk drive is shown as being inserted into the external spiral servo writer 42. In an alternative embodiment, only the HDA 52 is inserted into the external spiral servo writer 42. In yet another embodiment, a media writer is used to write the spiral tracks 24₀-24ₙ to a number of disks 18, and one or more of the disks 18 are then inserted into an HDA 52.

Figure 5A:
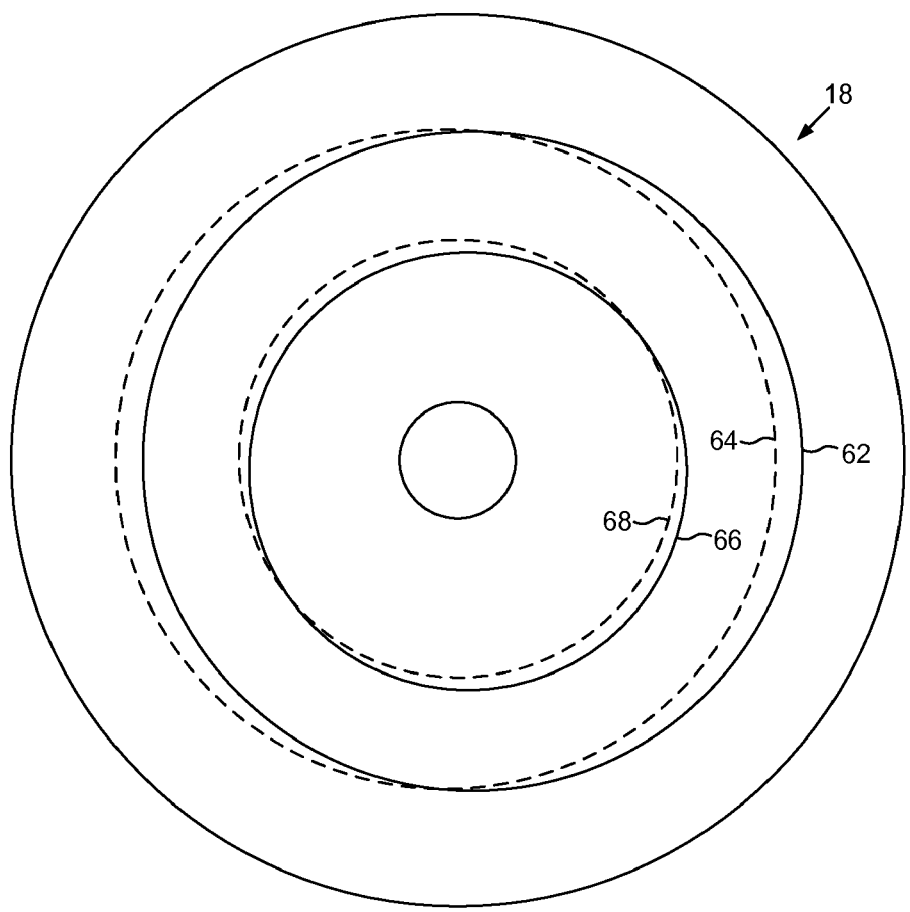
FIGS. 5A and 5B show an embodiment of the present invention illustrating how the spiral component causes a phase shift in the repeatable position error as a radial location of the head changes.
Figure 5B:
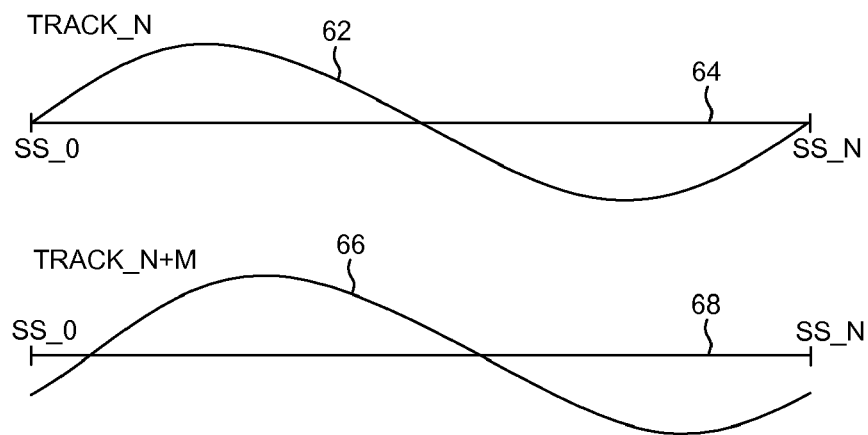

When the servo sectors 20₀-20ₙ are written to the disk 18, imperfections in the servo writing process prevents the servo sectors from defining perfectly concentric tracks with respect to a rotational axis of the disk 18. The eccentricity of the resulting servo tracks results in a repeatable runout in the PES when reading the servo sectors 20₀-20ₙ. This is illustrated in the embodiment of FIG. 5A wherein a servo track 62 defined by the servo sectors 20₀-20ₙ is eccentric compared to a perfectly concentric servo track 64. This results in a coherent sinusoidal error in the PES as illustrated FIG. 5B. In addition to the repeatable runout due to an eccentricity of the servo tracks, writing the servo sectors by servoing off of spiral tracks induces a spiral component in the repeatable position error which essentially induces a phase offset in the repeatable runout based on the radial location of the head. This is illustrated in FIG. 5B wherein a phase shift occurs in the sinusoidal error for servo track 66 (relative to a concentric servo track 68) as compared to the sinusoidal error for servo track 62. In an embodiment describe below, the phase of the sinusoidal error changes at a constant, known rate across the radius of the disk due to the spiral component, therefore the phase shift for all of the servo tracks due to the spiral component can be determined once the phase shift for one of the servo tracks is determined.

The embodiment of FIG. 5B shows a fundamental frequency of the repeatable position error corresponding to the rotational frequency of the disk. In other embodiments, the repeatable position error may comprise a fundamental frequency as well as harmonics of the fundamental frequency. Accordingly, in some embodiments of the present invention the control circuitry compensates for the fundamental frequency and/or harmonics of the fundamental frequency of the repeatable position error as described in greater detail below.

The sinusoidal error shown in FIG. 5B can be represented by estimating coefficients of a sinusoid:

$$a \cdot \cos(2\pi\omega_j k/N) + b \cdot \sin(2\pi\omega_j k/N)$$

where the coefficients comprise a and b, $\omega_j$ represents one of a fundamental frequency and a harmonic frequency of the repeatable position error, and k represents one of N servo sectors written around the target track. In one embodiment, the coefficients comprise:

$$a = a^{coh} + a^{sp}$$

$$b = b^{coh} + b^{sp}$$

where $a^{coh}$ and $b^{coh}$ represent the coherent component and $a^{sp}$ and $b^{sp}$ represent the spiral component.

The control circuitry may calibrate the spiral component of the coefficients in any suitable manner. In one embodiment, the control circuitry generates the coefficients of the sinusoid for two tracks that are close enough such that the difference in the coherent component is substantially zero. Accordingly, the difference between the coefficients generated for the first and second tracks represents the difference between the spiral component. Once the difference between the spiral components is known, the spiral component for one of the tracks (a target track) can be computed based on the difference and the radial distance between the tracks:

$$\begin{bmatrix} a_1^{sp} \\ b_1^{sp} \end{bmatrix} = \begin{bmatrix} -c1 & c2 \cdot \cot(\theta/2) \\ -c3 \cdot \cot(\theta/2) & -c4 \end{bmatrix} \begin{bmatrix} \delta_a \\ \delta_b \end{bmatrix}$$

where:

$$\begin{bmatrix} \delta_a \\ \delta_b \end{bmatrix} = \begin{bmatrix} a_2^{sp} - a_1^{sp} \\ b_2^{sp} - b_1^{sp} \end{bmatrix}$$

$a_1^{sp}$ and $b_1^{sp}$ represent the spiral component at the target track, $a_2^{sp}$ and $b_2^{sp}$ represent the spiral component at a second track, and $\theta$ represents a radial distance between the target track and the second track. The coefficients c1, c2, c3 and c4 may be any suitable values, and in one embodiment, they are predetermined based on the known characteristics of the spiral tracks and the resulting spiral component of the repeatable position error.

Once the spiral component of the coefficients $a_1^{sp}$ and $b_1^{sp}$ have been determined for a target track as described above, the spiral component of the coefficients for the other tracks can be computed based on the radial distance between the target track and the other tracks. For example, in one embodiment when the control circuitry positions the head over a second track having a radial distance away from the target track, the control circuitry generates the spiral component of the coefficients of the sinusoid for the second track according to:

$$\begin{bmatrix} a_2^{sp} \\ b_2^{sp} \end{bmatrix} = \begin{bmatrix} \cos(\theta) & -\sin(\theta) \\ \sin(\theta) & \cos(\theta) \end{bmatrix} \begin{bmatrix} a_1^{sp} \\ b_1^{sp} \end{bmatrix}$$

where:
$a_1^{sp}$ and $b_1^{sp}$ represent the spiral component at the target track;
$a_2^{sp}$ and $b_2^{sp}$ represent the spiral component at a second track; and
$\theta$ represents the radial distance between the target track and the second track.

Figure 6A:
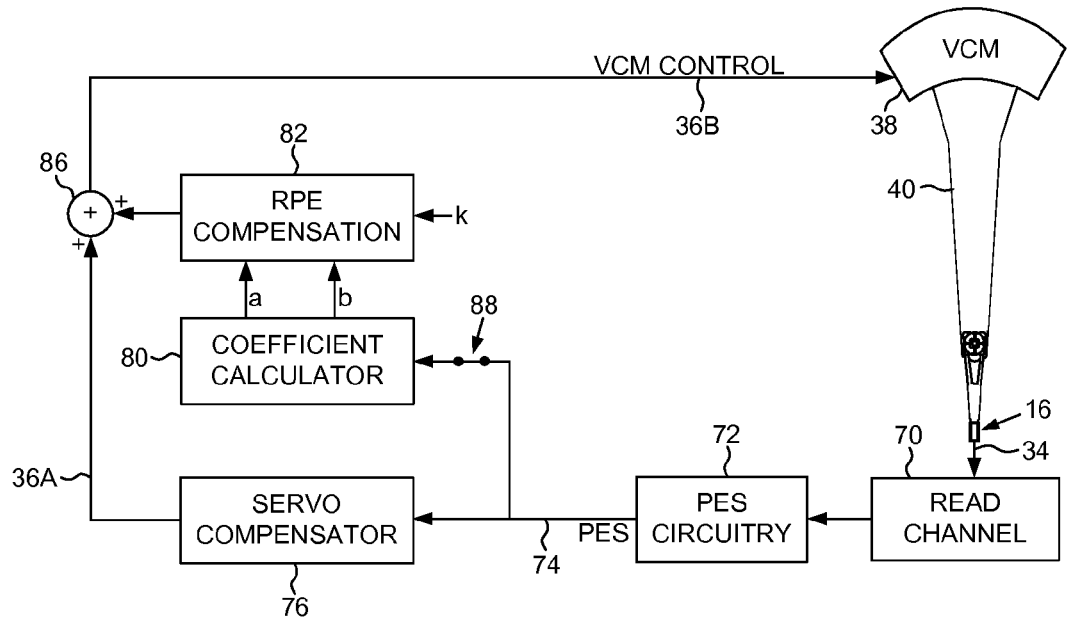
FIGS. 6A and 6B show an embodiment of the present invention wherein the coefficients of the sinusoid are used to generate feedforward compensation for following the repeatable position error.

FIG. 6A shows an embodiment of the present invention wherein the control circuitry is operable to generate feedforward compensation values in response to the coefficients of the sinusoid so that the head substantially follows the repeatable position error (RPE). A read channel 70 demodulates the servo bursts from the read signal 34, and PES circuitry 72 generates the PES 74 (using any suitable technique). A servo compensator 76 filters the PES 74 to generate a VCM control signal 36A. A coefficient calculator 80 calculates coefficients of a sinusoid representing the RPE of the servo track as described above. The coefficients of the sinusoid are processed by a compensation circuit 82 to generate an RPE compensation value 84 for each servo sector (indexed by k). The RPE compensation value 84 is added 86 to VCM control signal 36A as feedforward compensation, thereby generating VCM control signal 36B that causes the head 16 to follow the RPE (coherent and spiral RPE described above). During calibration, the coefficient calculator 80 adjusts the coefficients of the sinusoid until the average PES 74 falls below a threshold (i.e., until the coefficients converge). Further details of how the coefficients of the sinusoid may be adapted are disclosed in U.S. Pat. No. 7,265,933 entitled "DISK DRIVE COMPUTING REPEATABLE RUN OUT WHILE ACTUATOR ARM IS PRESSED AGAINST CRASH STOP", the disclosure of which is incorporated herein by reference. Other embodiments may generate the RPE compensation values 84 using different techniques to achieve the same result.

Figure 6B:
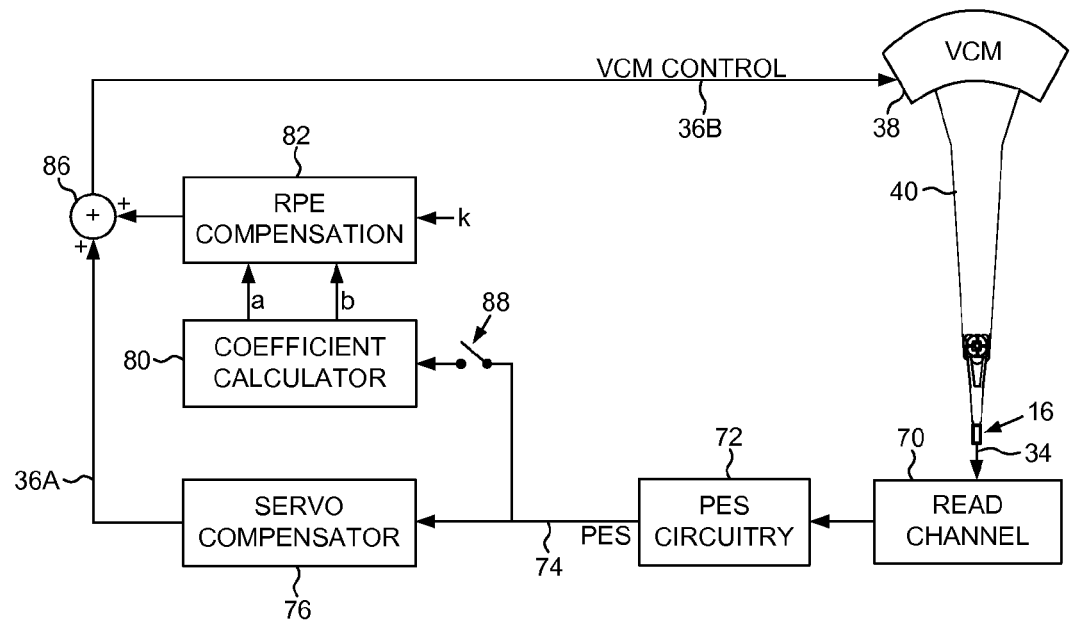

Once the RPE compensation values 84 have been calibrated as described above with reference to FIG. 6A, in an embodiment shown FIG. 6B, a switch 88 disables the input of the coefficient calculator 80 so that the coefficients of the sinusoid are not adapted during normal operation of the disk drive. In other embodiments, the switch 88 may remain closed during normal operation in order to adapt the coefficients so as to compensate for changes in the disk drive that may occur over time, such as changes in environmental conditions (e.g., temperature). In one embodiment, when the head is initially positioned over a new servo track, the spiral component of the coefficients is computed as described above, and then the coefficients are adapted as described above until they converge to acceptable values. In one embodiment, a single value for the coherent component of the coefficients may be used for all of the servo tracks (i.e., calibrated once), and in another embodiment, a coherent component may be calibrated at different radial locations at any suitable resolution (e.g., every N servo tracks). In one embodiment, when the head is initially positioned over a new servo track, the coherent component of the coefficients is initialized based on the radial location of the new servo track, the spiral component is computed as described above, and then the coefficients are adapted until they converge to acceptable values.

Figure 7A:
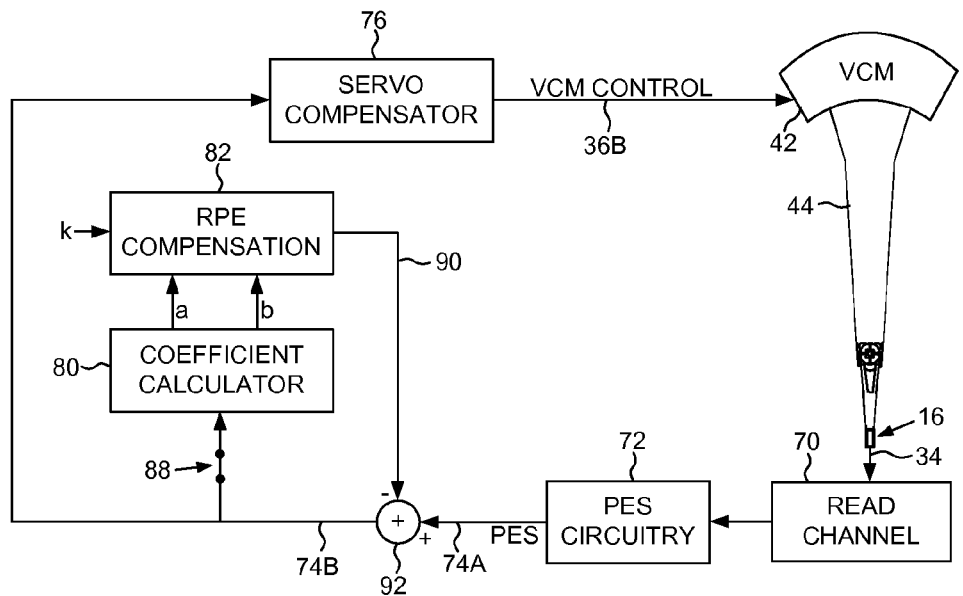
FIGS. 7A and 7B show an embodiment of the present invention wherein the coefficients of the sinusoid are used to generate feedback compensation for ignoring the repeatable position error.
Figure 7B:
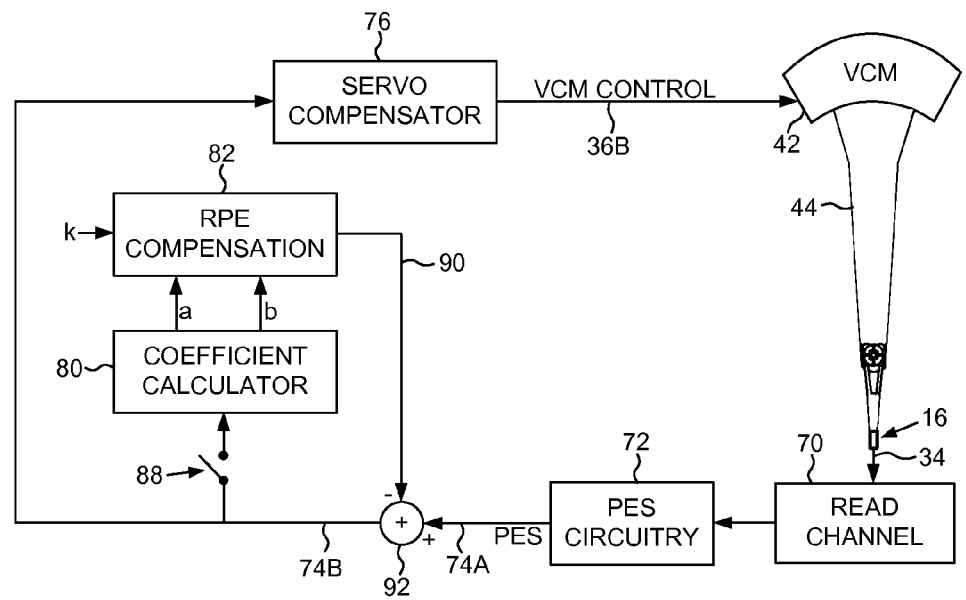

FIG. 7A shows an embodiment of the present invention wherein the control circuitry is operable generate feedback compensation values in response to the coefficients of the sinusoid so that the head substantially ignores the RPE. In this embodiment, the data tracks for writing/reading data are defined along a substantially circular path relative to the eccentric servo tracks. The RPE compensation values 90 in this embodiment are subtracted 92 from the PES 74A to generate a compensated PES 74B as shown in FIG. 7A so that the head does not follow the eccentric path of the servo track (but instead follows a substantially circular path of the data track). During calibration, the coefficient calculator 80 adjusts the coefficients of the sinusoid until the average of the compensated PES 74B falls below a threshold (i.e., until the coefficients converge). Similar to the embodiment described above, a switch 88 may disable the coefficient calculator 80 during normal operation as illustrated in FIG. 7B, or the switch 88 may keep the coefficient calculator 80 enabled so that the coefficients are adapted during normal operation. In one embodiment, the coefficients computed by the coefficient calculator 80 will converge to different values for the feedback embodiment shown in FIG. 7A as compared to the coefficients values computed for the feedforward embodiment shown in FIG. 6A.

In one embodiment, the control circuitry is operable to generate coefficients of a first and second sinusoid corresponding to the target track, wherein the first sinusoid corresponds to a fundamental frequency of the repeatable position error, and the second sinusoid corresponds to a harmonic frequency of the repeatable position error. In this embodiment the RPE compensation values (feedforward or feedback) may be generated according to:

$$[a_1 \cdot \cos(2\pi\omega_1 k/N) + b_1 \cdot \sin(2\pi\omega_1 k/N)] + [a_2 \cdot \cos(2\pi\omega_2 k/N) + b_2 \cdot \sin(2\pi\omega_2 k/N)]$$

where $\omega_1$ corresponds to the fundamental frequency and $\omega_2$ corresponds to a harmonic of the fundamental frequency. Other embodiments may generate coefficients to compensate for additional harmonics of the repeatable position error.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of servo sectors defining a plurality of tracks, wherein the servo sectors are written to the disk by servoing off of spiral tracks;
    a head actuated over the disk; and
    control circuitry operable to:
        position the head over a target track in response to the servo sectors;
        generate coefficients of a first sinusoid corresponding to the target track,
        wherein:
            the first sinusoid corresponds a repeatable position error of the head relative to the target track;
            the coefficients of the first sinusoid comprise a coherent component due to a repeatable runout of the disk and a spiral component due to writing the servo sectors by servoing off of the spiral tracks; and
            the spiral component varies based on a radial location of the head; and
        servo the head over the target track in response to the coefficients.

2. The disk drive as recited in claim 1, wherein the first sinusoid comprises:

$$a \cdot \cos(2\pi\omega_j k/N) + b \cdot \sin(2\pi\omega_j k/N)$$

where:
the coefficients comprise a and b;
$\omega_j$ represents one of a fundamental frequency and a harmonic frequency of the repeatable position error; and
k represents one of N servo sectors written around the target track.

3. The disk drive as recited in claim 2, wherein the coefficients comprise:

$$a = a^{coh} + a^{sp}$$

$$b = b^{coh} + b^{sp}$$

where $a^{coh}$ and $b^{coh}$ represent the coherent component and $a^{sp}$ and $b^{sp}$ represent the spiral component.

4. The disk drive as recited in claim 3, wherein the control circuitry generates the spiral component according to:

$$\begin{bmatrix} a_1^{sp} \\ b_1^{sp} \end{bmatrix} = \begin{bmatrix} -c1 & c2 \cdot \cot(\theta/2) \\ -c3 \cdot \cot(\theta/2) & -c4 \end{bmatrix} \begin{bmatrix} \delta_a \\ \delta_b \end{bmatrix}$$

where:

$$\begin{bmatrix} \delta_a \\ \delta_b \end{bmatrix} = \begin{bmatrix} a_2^{sp} - a_1^{sp} \\ b_2^{sp} - b_1^{sp} \end{bmatrix}$$

$a_1^{sp}$ and $b_1^{sp}$ represent the spiral component at the target track;
$a_2^{sp}$ and $b_2^{sp}$ represent the spiral component at a second track; and
$\theta$ represents a radial distance between the target track and the second track.

5. The disk drive as recited in claim 4, wherein the control circuitry is further operable to:
position the head over a second track; and
generate the spiral component of the coefficients of the first sinusoid for the second track in response to a radial distance between the target track and the second track:

$$\begin{bmatrix} a_2^{sp} \\ b_2^{sp} \end{bmatrix} = \begin{bmatrix} \cos(\theta) & -\sin(\theta) \\ \sin(\theta) & \cos(\theta) \end{bmatrix} \begin{bmatrix} a_1^{sp} \\ b_1^{sp} \end{bmatrix}$$

where:
$a_1^{sp}$ and $b_1^{sp}$ represent the spiral component at the target track;
$a_2^{sp}$ and $b_2^{sp}$ represent the spiral component at a second track; and
$\theta$ represents the radial distance between the target track and the second track.

6. The disk drive as recited in claim 1, wherein the control circuitry is further operable to:
position the head over a second track; and
generate the coefficients of the first sinusoid for the second track in response to a radial distance between the target track and the second track.

7. The disk drive as recited in claim 1, wherein the control circuitry is further operable to generate feedforward compensation values in response to the coefficients of the first sinusoid so that the head substantially follows the repeatable position error.

8. The disk drive as recited in claim 1, wherein the control circuitry is further operable to generate feedback compensation values in response to the coefficients of the first sinusoid so that the head substantially ignores the repeatable position error.

9. The disk drive as recited in claim 1, wherein the control circuitry is further operable to generate coefficients of a second sinusoid corresponding to the target track, wherein:
the first sinusoid corresponds to a fundamental frequency of the repeatable position error; and
the second sinusoid corresponds to a harmonic frequency of the repeatable position error.

10. A method of operating a disk drive, the disk drive comprising a head actuated over a disk comprising a plurality of servo sectors defining a plurality of tracks, wherein the servo sectors are written to the disk by servoing off of spiral tracks, the method comprising:
positioning the head over a target track in response to the servo sectors;
generating coefficients of a first sinusoid corresponding to the target track,
wherein:
the first sinusoid corresponds a repeatable position error of the head relative to the target track;
the coefficients of the first sinusoid comprise a coherent component due to a repeatable runout of the disk and a spiral component due to writing the servo sectors by servoing off of the spiral tracks; and
the spiral component varies based on a radial location of the head; and
servoing the head over the target track in response to the coefficients.

11. The method as recited in claim 10, wherein the first sinusoid comprises:

$$a \cdot \cos(2\pi\omega_j k/N) + b \cdot \sin(2\pi\omega_j k/N)$$

where:
the coefficients comprise a and b;
$\omega_j$ represents one of a fundamental frequency and a harmonic frequency of the repeatable position error; and
k represents one of N servo sectors written around the target track.

12. The method as recited in claim 11, wherein the coefficients comprise:

$$a = a^{coh} + a^{sp}$$

$$b = b^{coh} + b^{sp}$$

where $a^{coh}$ and $b^{coh}$ represent the coherent component and $a^{sp}$ and $b^{sp}$ represent the spiral component.

13. The method as recited in claim 12, further comprising generating the spiral component according to:

$$\begin{bmatrix} a_1^{sp} \\ b_1^{sp} \end{bmatrix} = \begin{bmatrix} -c1 & c2 \cdot \cot(\theta/2) \\ -c3 \cdot \cot(\theta/2) & -c4 \end{bmatrix} \begin{bmatrix} \delta_a \\ \delta_b \end{bmatrix}$$

where:

$$\begin{bmatrix} \delta_a \\ \delta_b \end{bmatrix} = \begin{bmatrix} a_2^{sp} - a_1^{sp} \\ b_2^{sp} - b_1^{sp} \end{bmatrix}$$

$a_1^{sp}$ and $b_1^{sp}$ represent the spiral component at the target track;
$a_2^{sp}$ and $b_2^{sp}$ represent the spiral component at a second track; and
$\theta$ represents a radial distance between the target track and the second track.

14. The method as recited in claim 13, further comprising:
positioning the head over a second track; and
generating the spiral component of the coefficients of the first sinusoid for the second track in response to a radial distance between the target track and the second track:

$$\begin{bmatrix} a_2^{sp} \\ b_2^{sp} \end{bmatrix} = \begin{bmatrix} \cos(\theta) & -\sin(\theta) \\ \sin(\theta) & \cos(\theta) \end{bmatrix} \begin{bmatrix} a_1^{sp} \\ b_1^{sp} \end{bmatrix}$$

where:
$a_1^{sp}$ and $b_1^{sp}$ represent the spiral component at the target track;
$a_2^{sp}$ and $b_2^{sp}$ represent the spiral component at a second track; and
$\theta$ represents the radial distance between the target track and the second track.

15. The method as recited in claim 10, further comprising:
positioning the head over a second track; and
generating the coefficients of the first sinusoid for the second track in response to a radial distance between the target track and the second track.

16. The method as recited in claim 10, further comprising generating feedforward compensation values in response to the coefficients of the first sinusoid so that the head substantially follows the repeatable position error.

17. The method as recited in claim 10, further comprising generating feedback compensation values in response to the coefficients of the first sinusoid so that the head substantially ignores the repeatable position error.

18. The method as recited in claim 10, further comprising generating coefficients of a second sinusoid corresponding to the target track, wherein:
the first sinusoid corresponds to a fundamental frequency of the repeatable position error; and
the second sinusoid corresponds to a harmonic frequency of the repeatable position error.

* * * * *